(No Model.)

J. P. KIRK.
PLOW.

No. 371,593. Patented Oct. 18, 1887.

Witnesses:
Chas. J. Williamson
Sullivan Fowles

Inventor:
John P. Kirk
pr Edw. W. Donn
Atty.

UNITED STATES PATENT OFFICE.

JOHN P. KIRK, OF AUSTIN, TEXAS.

PLOW.

SPECIFICATION forming part of Letters Patent No. 371,593, dated October 18, 1887.

Application filed October 11, 1886. Serial No. 215,965. (No model.)

*To all whom it may concern:*

Be it known that I, JOHN P. KIRK, a citizen of the United States, residing at Austin, in the county of Travis and State of Texas, have invented a new and useful Improvement in Plows, of which the following is a specification.

My invention relates to improvements in plows; and the objects of my improvements are, first, to provide a continuously-revolving mold-board; second, to keep said mold-board clear of adhering soil, and, third, to reduce the friction of the mold-board and landside of the plow. I attain these objects by the mechanism illustrated in the accompanying drawings, in which—

Figure 1:
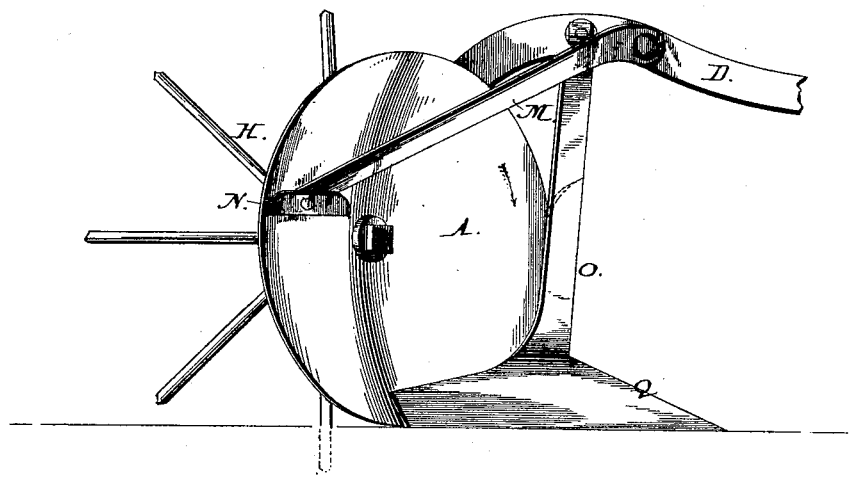
Figure 2:
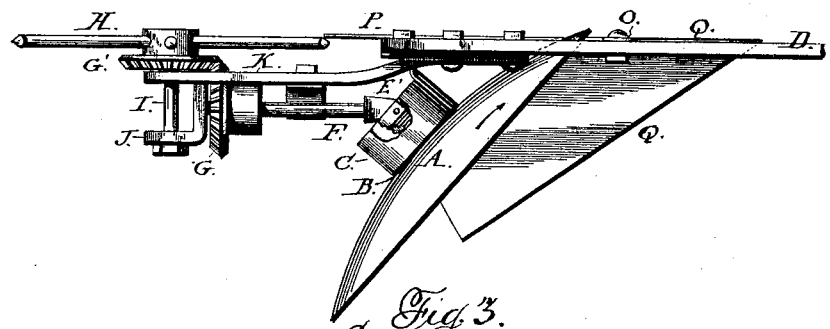
Figure 3:
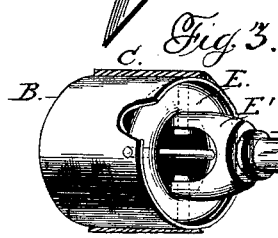

Figure 1 is a side elevation of the plow, showing more particularly the application of the scraper. Fig. 2 is a plan or top view of the plow, showing the gearing connecting the driving-wheel and mold-board. Fig. 3 is a detail of the universal joint.

Similar letters refer to similar parts throughout the several views.

A concave metallic disk, A, is provided with a hollow hub, B, projecting from its convex side. A box or bearing, C, is attached to the beam D, within which the hub B revolves. Within the hub B are parts E E' of a toggle or universal joint, composed of ring E and knuckle E', attached to the front end of shaft F. On the rear end of the shaft F a miter-wheel, G, is attached. A driving-wheel, H, having on the side of its hub a miter-wheel, G', corresponding in size with G and into which it meshes, is provided with a shaft, I, which revolves in bearings J. The rear end of shaft F is also provided with a suitable bearing, as shown. A support, K, is firmly attached to the bearing-piece J and to the beam D. The driving-wheel H, running in the furrow, is set below the line of the bottom of the plow, thus allowing it to impinge upon or enter into the ground at the bottom of the furrow.

The forward motion of the plow giving motion to driving-wheel H, it is transmitted, through miter-wheels G and G', shaft F, and the toggle-joint, to the disk A, causing it to revolve in the direction of the arrow.

Fastened to the beam D, by means of a clamp or bolt, is a steel bar, M, provided at its lower end with a blade or scraper, N, joined by a rivet or bolt, so as to allow it to accommodate itself to the concave surface of disk A, against which it is pressed by the spring of bar M. In front of the disk A an upright, O, wide enough to protect the front of the disk and turn the soil upon it, is firmly secured at the bottom to the crotch or fork of the landside P and share Q. The parts being thus arranged and the plow put in motion, the soil passes from the share Q and upright O against the disk A, adhering to which it is carried up to the blade or scraper N, which removes it and allows it to fall to the side of the cut of the plow.

I have this day (March 16, 1887) filed an application for a patent which includes the universal joint shown and described in the present application, and also the rotary mold-board and driving-wheel as set forth herein; but in the new case referred to I use no gear-wheels to connect the driving-wheel to the universal joint, and I connect the said joint directly to the mold-board.

I am aware that scrapers have been used in connection with rotary mold-boards provided with a flexible arm and a scraping-blade fixed at right angles to the same, and to such I make no claim, broadly. Mine has the scraping-blade not fixed to the flexible arm, but pivoted to the same to admit of automatic adjustment.

I am aware that prior to my invention plows with revolving mold-boards operated by means of an auxiliary wheel and a universal joint have been made. I therefore do not claim such a combination, broadly; but What I do claim as my invention, and desire to secure by Letters Patent, is—

1. The hollow hub or sleeve C, in combination with the universal joint composed of a band fitting loosely within said sleeve, a gimbal-ring pivoted to said band, and a knuckle pivoted to said gimbal-ring, whereby motion may be transmitted from one rotary body to another when the planes of rotation are or are not parallel to each other.

2. The combination, with a plow-beam, a rotary driving-wheel and a rotary mold-board, both indirectly journaled in said plow-beam, of the universal joint, substantially as described, and the gearing, as set forth, connecting the mold-board and universal joint with the driving-wheel, as and for the purpose specified.

3. The combination, with a rotary mold-board, of a scraper consisting of a long spring-arm secured adjustably to the plow-beam, and an automatic scraping-blade pivoted to the said spring-arm, arranged so that through the elasticity of the long arm and the automatic adjustability of the scraping-blade the edge of said blade may always be normal to the concave surface of the said mold-board, as and for the purpose set forth.

4. A driving-wheel for the rotary moldboard of a plow, composed of a hub journaled to the plow-beam, and radial arms, substantially as set forth.

JNO. P. KIRK.

Witnesses:
W. H. SHELLEY,
H. H. DUFF.